(12) United States Patent
Lukasik et al.

(10) Patent No.: US 9,426,476 B2
(45) Date of Patent: Aug. 23, 2016

(54) VIDEO STREAM

(75) Inventors: Derek Lukasik, Ft. Collins, CO (US); Jeffrey Joel Walls, Fort Collins, CO (US); Mark Edward Nylund, Berthoud, CO (US); Reynaldo Cardoso Novaes, Novo Hamburgo (BR); Paulo Roisenberg, Porto Alegre Rio Grande Do Sul (BR); Joao Luis Prauchner, Porto Alegre Rio Grande Do Sul (BR); Adriano Silveira Krauthein, Porto Alegre Rio Grande Do Sul (KR)

(73) Assignee: Hewlett-Packard Development Company, L.P., Houston, TX (US)

( * ) Notice: Subject to any disclaimer, the term of this patent is extended or adjusted under 35 U.S.C. 154(b) by 853 days.

(21) Appl. No.: 13/544,296

(22) Filed: Jul. 9, 2012

(65) Prior Publication Data

US 2014/0010289 A1    Jan. 9, 2014

(51) Int. Cl.
*H04N 7/26* (2006.01)
*H04N 19/136* (2014.01)
*H04N 19/119* (2014.01)
*H04N 19/172* (2014.01)
*H04N 19/12* (2014.01)

(52) U.S. Cl.
CPC ........... *H04N 19/136* (2014.11); *H04N 19/119* (2014.11); *H04N 19/12* (2014.11); *H04N 19/172* (2014.11)

(58) Field of Classification Search
CPC ... H04N 19/119; H04N 19/172; H04N 19/12; H04N 19/136
USPC ...................................................... 375/240.08
See application file for complete search history.

(56) References Cited

U.S. PATENT DOCUMENTS

| 5,970,233 | A | 10/1999 | Liu et al. | |
| 8,036,265 | B1 * | 10/2011 | Reynolds | ................ H04L 29/06 375/240.01 |
| 2001/0026591 | A1 * | 10/2001 | Keren et al. | ............. 375/240.26 |
| 2003/0017846 | A1 * | 1/2003 | Estevez | .................. H04N 19/59 455/556.1 |

(Continued)

FOREIGN PATENT DOCUMENTS

EP    0 332 345 B1    6/1995

*Primary Examiner* — Christopher S Kelley
*Assistant Examiner* — Zhihan Zhou
(74) *Attorney, Agent, or Firm* — Tarolli, Sundheim, Covell & Tummino L.L.P.

(57) ABSTRACT

An example system can comprise a memory to store machine readable instructions. The system can also comprise a processing unit to execute the machine readable instructions. The machine readable instructions can a server can comprise a codec selector to dynamically partition a video stream into a plurality of partitions based on graphical elements of the video stream, such that a given frame of the video stream is divided into the plurality of partitions. The codec selector can also select a plurality of different codecs to compress the plurality of partitions based on the graphical elements of the video stream.

17 Claims, 5 Drawing Sheets

(56) References Cited

U.S. PATENT DOCUMENTS

| | | | |
|---|---|---|---|
| 2003/0237090 A1* | 12/2003 | Boston | H04N 5/76 725/37 |
| 2004/0045030 A1* | 3/2004 | Reynolds | H04L 29/06 725/110 |
| 2004/0165783 A1* | 8/2004 | Reynolds et al. | 382/239 |
| 2005/0038645 A1* | 2/2005 | Mabey et al. | 704/201 |
| 2007/0153910 A1* | 7/2007 | Levett | 375/240.25 |
| 2008/0181400 A1* | 7/2008 | Guleryuz et al. | 380/231 |
| 2008/0209048 A1* | 8/2008 | Sampath | H04L 29/06 709/227 |
| 2009/0238259 A1* | 9/2009 | Yeh | 375/240.01 |
| 2010/0111410 A1* | 5/2010 | Lu et al. | 382/166 |
| 2011/0243433 A1 | 10/2011 | Fagg et al. | |
| 2011/0274179 A1* | 11/2011 | Holden | H04N 21/23109 375/240.25 |
| 2011/0317763 A1* | 12/2011 | Takada | H04N 19/436 375/240.13 |
| 2012/0281748 A1* | 11/2012 | Peng et al. | 375/240.01 |

* cited by examiner

VIDEO STREAM

BACKGROUND

Streaming media is multimedia that is constantly received by and presented to an end-user computer while being delivered by a streaming provider. With streaming, a client browser or plug-in can start displaying media before an entire file containing the media has been transmitted. Internet television is a commonly streamed medium.

A remote computer is a computer to which a user does not have physical access, but which the user can access or manipulate by employment of a local computer that accesses the remote computer via a network. In some examples, the remote computer and/or the local computer can execute remote desktop software.

DETAILED DESCRIPTION

A video stream can be requested at a remote computer from a local computer over a network. The video stream could be implemented, for example, as a series of successive video frames, such as a real-time desktop of the remote computer. The remote computer can execute a codec selector that can dynamically partition the requested video stream into a plurality of partitions based on graphical elements of the video stream. The codec selector can select a plurality of different codecs to compress the plurality of partitions based on the graphical elements of the video stream. Each of the different codecs can, for example, compress a respective partition of the requested video stream. A codec mapper can merge the compressed partitions provided from the different codecs to generate a compressed video stream. The compressed video stream can be provided to the local computer via the network. In this manner, a codec can be selected for each partition of the requested video stream to achieve an efficient balance between bandwidth usage and image quality. In contrast to this, selecting only a single codec to compress a given video stream inherently results in excessive distortion of the given video stream or an excessive use of bandwidth to transmit the given video stream over a network.

Figure 1:
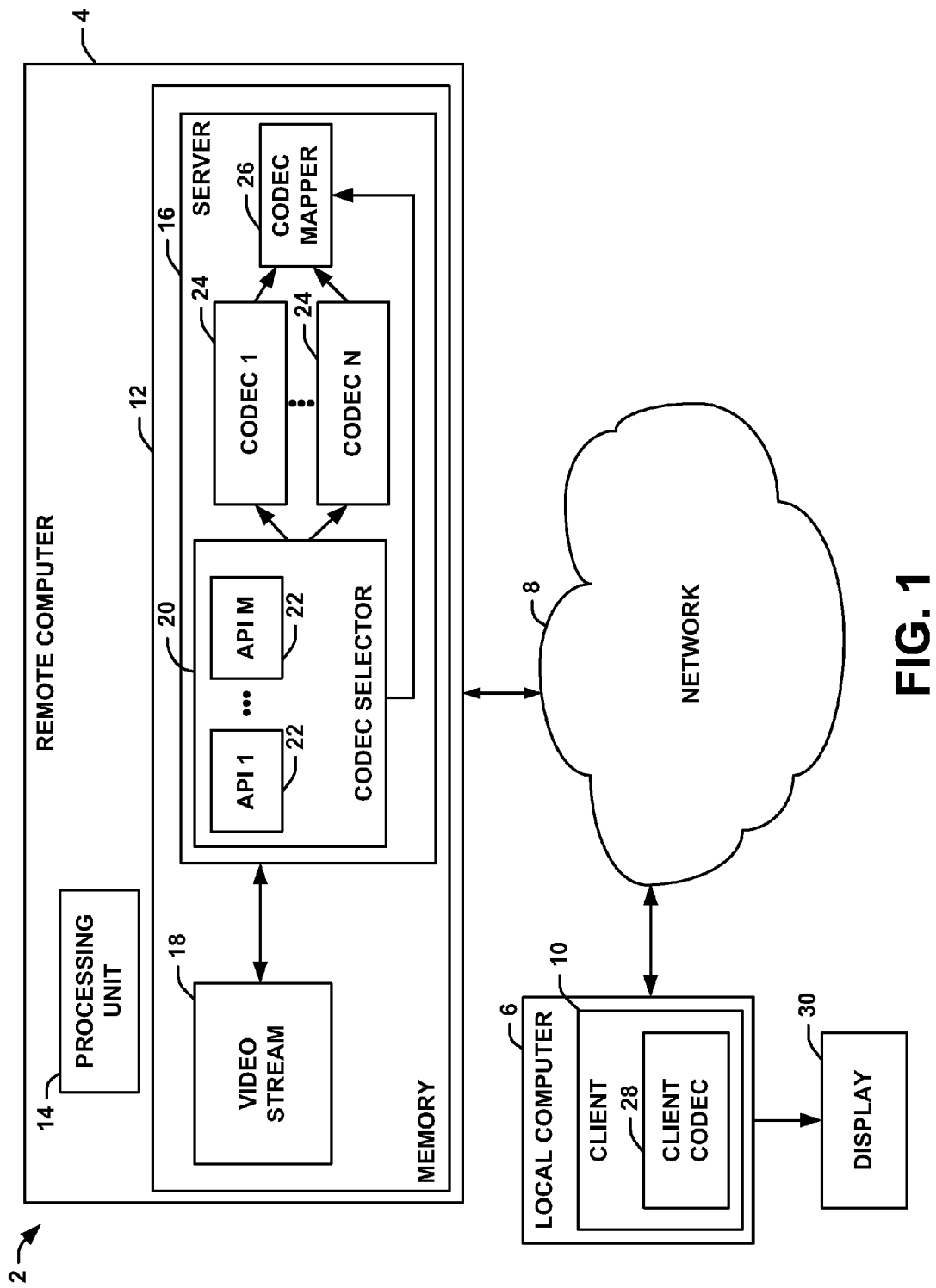
FIG. 1 illustrates an example of a system for providing a compressed video stream.

FIG. 1 illustrates an example of a system 2 for providing a compressed video stream 18 from a remote computer 4 to a local computer 6. The remote computer 4 and the local computer 6 can communicate over a network 8. The network 8 could be implemented, for example, as a public network (e.g., the Internet), a private network (e.g., cellular data network, a local area network or the like) or combination thereof. Nodes on the network 8 can communicate via a communications protocol, such as the Transmission Control Protocol/Internet Protocol (TCP/IP), the Internet Protocol version 6 (IPv6) or the like.

For purposes of simplification of explanation, in the present example, different components of the system 2 are illustrated and described as performing different functions. However, in other examples, the functionality of several components can be combined and executed on a single component. The components can be implemented, for example, as software (e.g., machine executable instructions), hardware (e.g., an application specific integrated circuit), or as a combination of both (e.g., firmware). In other examples, the components could be distributed among remote devices across the network 8 (e.g., external web services).

The local computer 6 could be implemented, for example, as a desktop computer, a laptop computer, as a personal digital assistant (PDA), a smartphone, a tablet computer or the like. In some examples, the local computer 6 can communicate with the network 8 wirelessly. In other examples, the local computer 6 can be tethered to the network 8 through a wired connection. In some examples, the local computer 6 can communicate with the remote computer 4 via two networks. For instance, in some examples, the remote computer 4 can be connected to a cellular data network (e.g., a 3G or 4G telecommunications network) that is in turn coupled to a public network (e.g., the Internet). In such a situation, the network 8 can represent both the cellular data network and the public network. In other examples, the local computer 6 can be coupled to the network 8 via a wireless fidelity (Wi-Fi) or a Worldwide Interoperability for Microwave Access (WiMax) connection.

The local computer 6 can a include client 10 executing thereon. The client 10 could be implemented, for example, as a browser (e.g., a web browser) or as an application programmed to interface with a server.

The remote computer 4 can be implemented as a computer that executes applications. The remote computer 4 can include a memory 12 for storing machine readable instructions. The memory 12 could be implemented as a non-transitory computer readable medium. For instance, the memory 12 could be implemented, for example, as volatile memory (e.g., random access memory), nonvolatile memory (e.g., flash memory, a hard drive, a solid state drive or the like) or a combination thereof. The remote computer 4 can also include a processing unit 14 for accessing the memory 12 and executing the machine readable instructions. The processing unit 14 can be implemented, for example, as a processor core.

The memory 12 can include a server 16 that can respond to requests from the client 10 of the local computer 6. In some examples, the server 16 and the client 10 could be employed to implement a remote desktop control system. In other examples, the server 16 and the client 10 can be employed to implement a video/audio player.

In one example, the client 10 can send a request to the server 16 for a video stream 18. The video stream 18 can represent streaming video that includes a series of successive frames. For instance, in one example, the client 10 can send a request to the server 16 for the video stream 18 that characterizes a real-time desktop of the remote computer 4. In other examples, the client 10 can send a request for a specific video file to the server 16.

The server 16 can include a codec selector 20 that can partition (e.g., split) the video stream 18 into multiple partitions and to dynamically select a codec for each of a partition of the multiple of a video stream based on image characteristics of each respective partition. As used herein, a partition refers to a region of the video stream 18 (e.g., corresponding to a contiguous graphical area of display) that has similar graphical features across one or more frames. Moreover, a combination of each of the partitions of the video stream forms the video stream as a whole, such that, for example, no region of the video stream can be in more than one partition. In some examples, each partition can have a rectangular shape. In other examples, other shapes (e.g., triangles and other polygons) can additionally or alternatively be employed. Additionally, the codec selector 20 can select a codec for each partition of the video stream 18 based on the in a manner explained herein. The codec selector 20 can be implemented to include M number of application programming interface (APIs) 22 that can interact with multiple components of the remote computer 4, which components facilitate generation of some portion of the video stream 18, and M is an integer greater than one. For instance, in some examples, the codec selector 20 can include a first API 22 (labeled in FIG. 1 as "API 1") that can, for example, interface with a mirror driver of the remote computer 4. The mirror driver can be implemented as a display driver for a virtual device that mirrors the drawing operations on a physical display device (e.g., a monitor). The first API 22 can employ heuristics to determine which partition of the video stream 18 contains text and/or two-dimensional (2-D) graphics). The heuristics can be, for example, a heuristic hierarchy. Upon identifying such a partition, the codec selector 20 can label the partition as a first type of partition, which is to be compressed (e.g., encoded) with a first type (e.g., format) of compression. The partition label can be implemented, for example, as a codec identifier. The first type of partition can be provided to a first codec 24 (labeled "CODEC 1" in FIG. 1) of N number of codecs 24, where N is an integer greater than one. Additionally, the codec selector 20 can provide a codec mapper 26 with boundary data that characterizes a boundary of the first type of partition and the partition label of the first type of partition.

Moreover, the codec selector 20 can also include a second API 22 that can, for example, interface with a three-dimensional (3-D) rendering engine and employ the heuristics to determine which partition of the video stream 18 contains 3-D rendered data. Upon identifying such a partition, the codec selector 20 can label the partition as a second type of partition, which is to be compressed with a second type of compression. The partition label can be implemented, for example, as a codec identifier. Additionally, the codec selector 20 can provide the codec mapper 26 with boundary data that characterizes a boundary of the second type of partition and the partition label of the second type of partition. Further, the codec selector 20 can also include a third API 22 that can, for example, interface with a video player and employ the heuristics to determine which partition of the video stream 18 contains a video. Upon identifying such a partition, the codec selector 20 can label the partition as a third type of partition, which is to be compressed with the second type of compression. The partition label can be implemented, for example, as a codec identifier. Partitions of the video stream 18 of the second and third types can be provided to a second codec 24 of N number of codecs 24. Additionally, the codec selector 20 can provide the codec mapper 26 with boundary data that characterizes a boundary of the third type of partition and the partition label of the third type of partition.

The codec selector 20 can periodically repartition the video stream 18 to update the selection of the codecs 24. For instance, changes to the video stream 18 can cause some regions of the video stream 18 to be better suited for different types of codecs than an initial selection indicated. Thus, the periodic repartitioning can ensure an efficient codec is selected for each partition.

Each of the N number of codecs 24 can compress provided partitions into a specific compression format by employing a specific encoding scheme. Each of the codecs can be implemented as a device and/or computer program capable of encoding a provided partition into a specific compression format. For instance, the first codec of the N number of codecs 24 can employ run length encoding (RLE) to compress partitions of the first type of partitions. RLE can substantially maintain the original image quality of the first type of partitions. Additionally, the second codec of the N number of codecs 24 can employ a discrete cosine transform (DCT) to compress partitions of the second and/or third types. The DCT can be implemented, for example, as the Joint Photographic Experts Group (JPEG) standard. Additionally or alternatively, in some examples, the second codec of the N number of codecs 24 can employ DCTs with temporal compression to compress partitions of the second and/or third types. The DCT with temporal compression can be implemented, for example, as the h.264 standard or the moving pictures experts group (MPEG)-2 standard. DCTs and DCTs with temporal compression can significantly reduce the size of the second and third types of partitions. In this manner, different partition of the video stream 18 can be compressed with different encoding schemes, such that a single frame of the video stream 18 can be compressed by the N number of codecs 24 into multiple compression formats.

A compressed partition can be provided from each of the N number of codecs 24 to the codec mapper 26 of the server 16. The codec mapper 26 can generate a compressed video that characterizes the (uncompressed) video stream 18 by merging the compressed partitions, such that the compressed video stream can include each of the compressed partitions. The codec mapper 24 can employ the boundary data and the partition labels of each of the first, second and third types of partitions provided by the codec selector 20 to generate and provide mapping data with the compressed video stream that identifies the compression format for each of the compressed partitions and boundary data identifying boundaries of each of the compressed partitions. The mapping data and the boundary data enable a codec to decompress (e.g., decode) the compressed video stream. The codec mapper 26 can provide the compressed video stream to the client 10 via the network 8.

The client 10 can include a client codec that can include a decoding codec that can decompress the compressed video stream to provide a decompressed video stream. The decompressed video stream can be output by a display 30 (e.g., a monitor). To decompress the compressed video stream, the client codec 28 can include a decoder corresponding to each of the N number of codecs 24. Additionally, the client codec 28 can examine the boundary data of compressed video stream to determine the boundary of partitions within the compressed video stream, as well as the mapping data to determine the type of compression employed in each of the partitions within the compressed video stream.

By employment of the system 2, the bandwidth usage of the network 8 can be reduced while the quality of the video stream 18 can be maintained. In particular, since the video stream 18 is compressed with multiple codecs, an efficient balance between bandwidth usage and image quality can be achieved.

Figure 2:
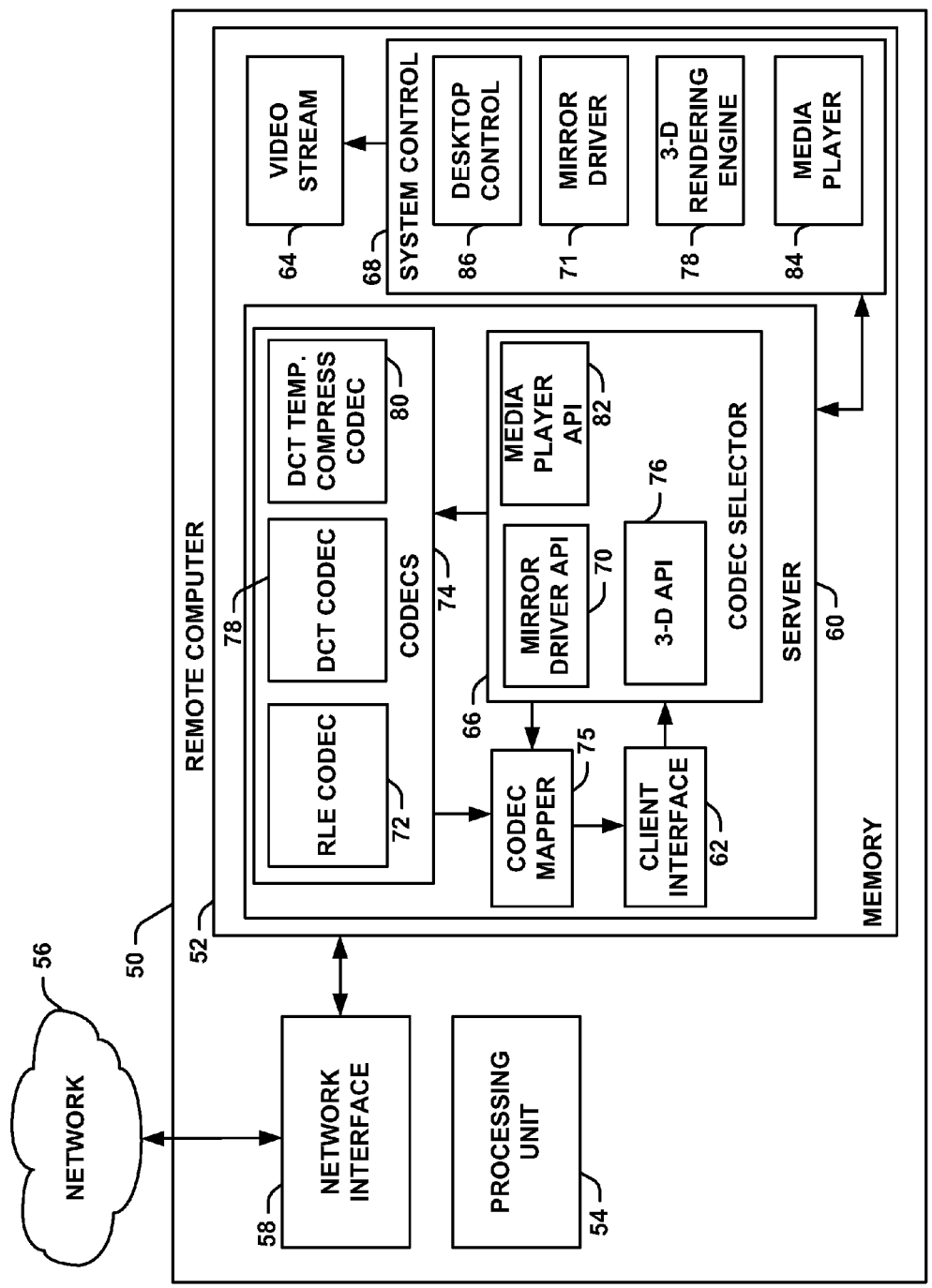
FIG. 2 illustrates an example of a remote computer system.

FIG. 2 illustrates an example of a remote computer 50 that could be employed, for example, to implement the remote computer 4 illustrated in FIG. 1. The remote computer 50 can include, for example, a memory 52 for storing machine readable instructions. The memory 52 could be implemented, for example, as volatile memory (e.g., random access memory), nonvolatile memory (e.g., flash memory, a hard disk drive, a solid-state drive or the like) or a combination thereof. The remote computer 50 can also include a processing unit 54 to access the memory 52 and execute the machine readable instructions. The processing unit 54 could be implemented, for example, as a processor core. The remote computer 50 can communicate with other nodes via a network 56. The network 56 could be implemented, for example, as a public network (e.g., the Internet) a private network (e.g., a local area network, a cellular data network or the like) or combination thereof. The network 56 can employ, for example, TCP/IP, IPv6 or the like. The remote computer 50 can communicate with the network 56 through a network interface 58 that could be implemented, for example, as a network interface card.

In the present example, the remote computer 50 is illustrated and described as providing remote control of a desktop of the remote computer 50 to a local computer (e.g., the local computer 6 illustrated in FIG. 1) via the network 56. In other examples, the remote computer 50 can provide videos to the local computer. The memory 52 of the remote computer 50 can include a server 60 that communicates with a client at the local computer. In particular, the server 60 can include a client interface 62 that can receive and respond to requests from the client at the local computer. In one example, the client interface 62 can receive a request for (real-time) control of the desktop of the remote computer 50.

In response to the request for control of the desktop of the remote computer 50, the client interface 62 can provide a compressed video stream that characterizes a real-time desktop of the remote computer 50. The compressed video stream provided to the client of the local computer can characterize the video stream 64 employed by the remote computer 50 to display the real-time desktop of the remote computer 50 on a display (e.g., a monitor). The video stream 64 can include a series of successive frames, wherein each frame represents the desktop of the remote computer 50 at an instance in time. The client interface 62 can send the request for the compressed video stream to a codec selector 66 of the server 60.

In the present example, the codec selector 66 of the server 60 includes three different APIs for interfacing with components of a system control 68 of the remote computer 50. In other examples, more or less (or different) APIs can be employed. The system control 68 can be employed, for example, to facilitate generation of graphical elements that can be employed in the video stream 64. The codec selector 66 can include a mirror driver API 70 that can interface with a mirror driver 71 of the system control 68. The mirror driver API 70 can employ heuristics to determine which partition of the video stream 64 contains text and/or two-dimensional graphics. The mirror driver API 70 can label the partition as an RLE partition, which can correspond, for example, to a partition of the first type described with respect to FIG. 1. The partition label can be implemented, for example, as a codec identifier. In some examples, a hierarchy of heuristics can be employed to determine the partition of the video stream 64 containing text and/or two-dimensional graphics. For instance, the mirror driver API 70 can examine the type of rendering commands employed to generate specific graphical elements to identify the RLE partition. In some example, the graphical elements of the RLE partition can be formed with basic two-dimensional rendering commands related to the generation of text, solid fills, rectangles or the like. Specifically, the RLE partition can contain graphical elements (e.g., text, solid fills or rectangles) that can be significantly distorted (e.g., by the inclusion of artifacts) with encoding schemes that employ, for example DCT and/or temporal compression. Additionally or alternatively, the heuristics employed by the mirror driver API 70 can count the number of colors employed to generate each graphical element in the video stream 64. Graphical elements with relatively few colors (e.g., 10 or fewer) can be included in the RLE partition. The mirror driver API 70 can provide data characterizing boundaries of the RLE partition. In some examples, the boundaries of the RLE partition can be a rectangle or other geometric shape. The codec selector 66 can provide the RLE partition to an RLE codec 72 of a plurality of codecs 74 (e.g., the N number of codecs 24 illustrated in FIG. 1). The codec selector 66 can provide boundary data for the RLE partition to a codec mapper 75, which boundary data can identify a boundary of the RLE partition. Additionally, the codec selector 66 can provide the codec mapper 75 with a partition label of the RLE partition that identifies the RLE codec 72.

Additionally, the codec selector 66 can include a 3-D API 76 that can interface with a 3-D rendering engine 78 of the system control 68 and employ heuristics and/or heuristics organized in a hierarchy to determine which partition of the video stream 64 contains 3-D graphic elements. The 3-D API 76 can label the partition with 3-D graphics as a 3-D partition (which can correspond, for example, to the second type of partition described with respect to FIG. 1). The partition label can be implemented, for example, as a codec identifier. For instance, the 3-D API 76 can employ a first heuristic in a hierarchy to examine the type of rendering commands employed to generate specific graphical elements to identify the 3-D partition. Such command can include block transfers (BLTs) that are being employed to generate particular graphical elements. In such a situation, the 3-D API 76 can provide data characterizing boundaries of the 3-D partition. In some examples, the boundaries of the 3-D partition can be a rectangle or other geometric shape.

Additionally, in some example, the 3-D API 76 can employ a second heuristic the hierarchy to examine the 3-D partition to determine if the 3-D partition should be compressed with a DCT encoding scheme or compressed with a DCT encoding scheme that includes temporal compression. The determination can be based on, for example, a rate of change per frame in the 3-D graphics and the 3-D partition. For instance, in 3-D graphic elements with a high rate of color change, the additional compression added by DCT with temporal compression (as compared to DCT compression) can (in some instances) fail to justify the additional processing needed to implement the DCT with temporal compression. Based on the determination, the 3-D API 76 can provide the 3-D partition to either a DCT codec 78 or a DCT with temporal compression codec 80 of the plurality of codecs 74. The codec selector 66 can provide boundary data for the 3-D partition to the codec mapper 75, which boundary data can identify a boundary of the 3-D partition. Additionally, the codec selector 66 can provide the codec mapper 75 with a partition label of the 3-D partition that identifies the DCT codec 78 or the DCT with temporal compression codec 80, depending on the codec selected by the 3-D API 76.

Still further, the codec selector 66 can include a media player API 82 that can interface with a media player 84 of the system control 68 to determine which partition of the video stream 64 contains full-motion video. The media player API 82 can label the partition with full-motion video as a video partition (which can correspond, for example, to the third type of partition described with respect to FIG. 1). For instance, the media player API 82 can employ a first heuristic in a hierarchy to can examine the type of rendering commands employed to generate specific graphical elements to identify the video partition. Such rendering commands can include a video decoding command this being employed to generate a particular graphical element. In such a situation, the media player API 82 can provide data characterizing boundaries of the video partition. In some examples, the boundaries of the video partition can be a rectangle or other geometric shape. Additionally or alternatively, the media player API 82 can count the number of colors employed to generate graphical elements in the video stream 64. Graphical elements with a relatively high number of colors (e.g., 10 or more) can be included in the video partition. The partition label can be implemented, for example, as a codec identifier.

The media player API 82 can employ a second heuristic in the hierarchy to examine the video partition to determine if the video partition should be compressed with the DCT encoding scheme or compressed with the DCT encoding scheme that includes temporal compression. For instance, in full-motion video with a high rate of change, the additional compression added by DCT with temporal compression (as compared to DCT compression) can (in some instances) fail to justify the additional processing needed to implement the DCT with temporal compression. The determination can be based on, for example, a rate of change per frame in the full-motion video of the video partition. Based on the determination, the media player API 82 can provide the video partition to either the DCT codec 78 or the DCT with temporal compression codec 80 of the plurality of codecs 74. The codec selector 66 can provide boundary data for the video partition to the codec mapper 75, which boundary data can identify a boundary of the video partition. Additionally, the codec selector 66 can provide the codec mapper 75 with a partition label of the video partition that identifies the DCT codec 78 or the DCT with temporal compression codec 80, depending on the codec selected by the media player API 82.

The RLE codec 72 can compress the RLE partition provided by the codec selector 66 into the RLE format by employing an RLE encoding scheme. The RLE encoding scheme can compress the RLE partition while substantially maintaining the quality of the video stream 64 corresponding to the RLE partition. The compressed RLE partition can be provided to a codec mapper 75 of the server 60.

The DCT codec 78 can compress the 3-D partition and/or the video partition provided from the codec selector 66 into the DCT format by employing a DCT encoding scheme, such as the JPEG standard. The DCT encoding scheme can significantly compress the size of the 3-D partition and/or the video partition without requiring undue processing time. Additionally or alternatively, the DCT with temporal compression codec 80 can compress the 3-D partition and/or the video partition provided from the codec selector 66 into the DCT with temporal compression format by employing a DCT with temporal compression encoding scheme, such as the h.264 or MPEG-2 standards. The DCT with temporal compression encoding scheme can significantly reduce the size of the 3-D partition and/or the video partition. The compressed 3-D partition and/or the compressed video partition can be provided to the codec mapper 75 of the server 60 from the DCT codec 78 and/or the DCT with temporal compression codec 80.

The codec selector 66 can periodically repartition the video stream 64 to update the selection of the plurality of codecs 74. For instance, changes to the video stream 64 can cause some regions of the video stream 18 to be better suited for different types of codecs than an initial selection indicated. Thus, the periodic repartitioning can ensure an efficient codec is selected for each partition.

The codec mapper 75 can merge the compressed RLE partition, the compressed 3-D partition and the compressed video partition to provide compressed video stream that characterizes the video stream 64. Additionally, the codec mapper 75 can employ the boundary data and the partition labels for the RLE partition, the 3-D partition and the video partition to include boundary data for the compressed video stream that identifies boundaries of the compressed RLE partition, the compressed 3-D partition and the compressed video partition, as well as mapping data (e.g., partition labels) characterizing the compression format of each compressed partition. As a result of the compression and merging, a given frame in the video stream 64 can be compressed with multiple codecs.

The compressed video stream can be provided to the client interface 62. The client interface 62 can provide the compressed video stream to the client of the local computer via the network 56. As described herein, the client of the local computer can decompress the compressed video stream to provide an uncompressed video stream corresponding to the video stream 64 of the remote computer 50, which can, for example, be employed to output a display similar to the desktop of the remote computer 50.

Additionally, the client interface 62 can receive data characterizing user input (e.g., text, and/or mouse clicks) from the client of the local computer. The client interface 62 can provide the data that characterizes the user input to a desktop control 86 of the system control 68. The desktop control 86 can actuate functions and/or applications based on the data characterizing the user input. In this manner, the local computer can control the remote computer 50.

Figure 3:
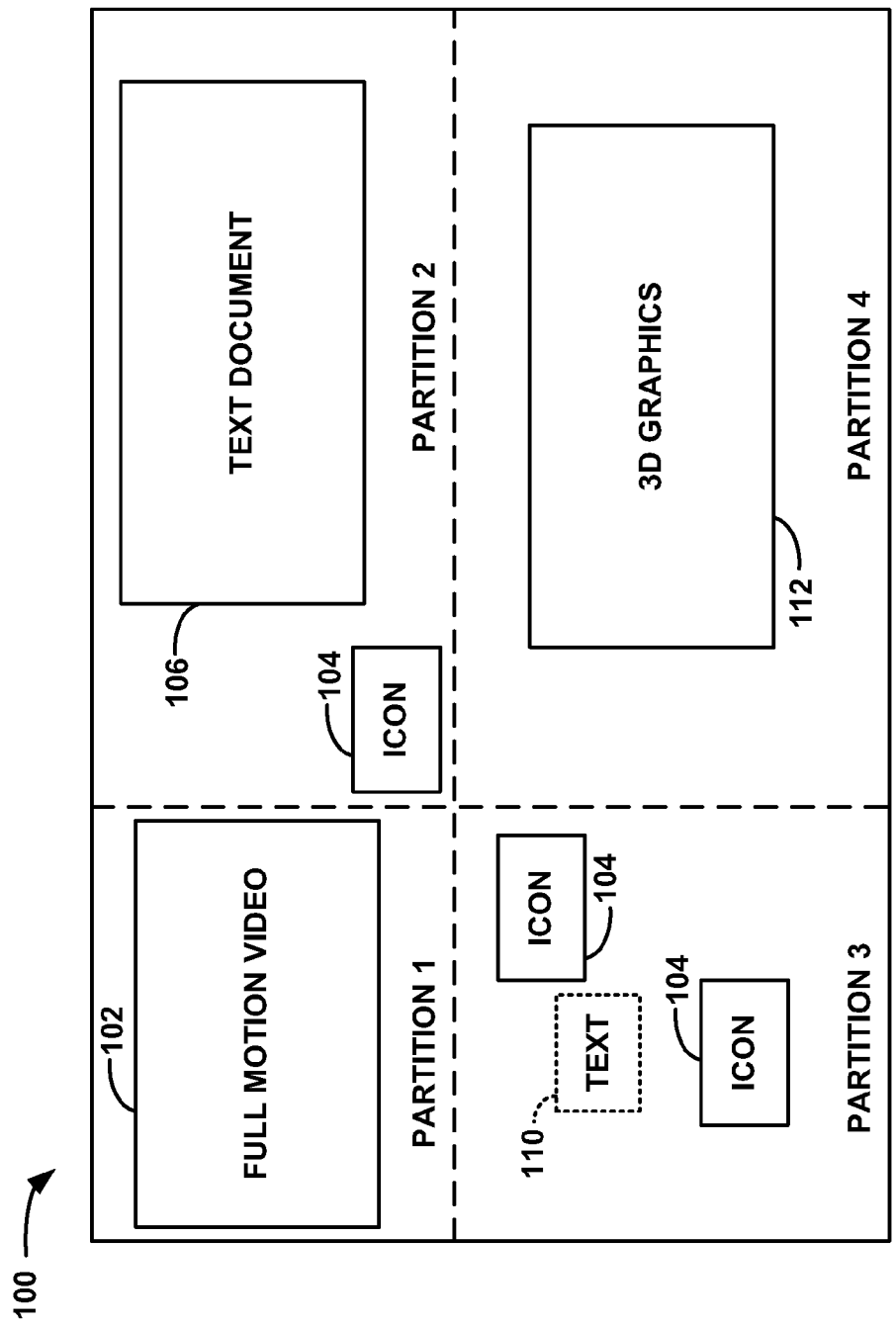
FIG. 3 illustrates an example of a frame of a video stream.

FIG. 3 illustrates an example of a frame of a video stream 100 characterizing a desktop of a remote computer (e.g., the remote computer 4 and/or 50 illustrated in FIGS. 1 and 2). The video stream 100 can be examined by a codec selector (e.g., the codec selector 20 and/or 66 illustrated in FIGS. 1 and 2). In the present example, the codec selector employ heuristics (or a hierarchy of heuristics) to partition (e.g., split) the video stream 100 into 4 different partitions, namely partitions 1-4 (labeled in FIG. 3 as "PARTITION 1", "PARTITION 2", "PARTITION 3" and "PARTITION 4"). Partition 1 can include a full-motion video 102 (e.g., an instructional video, a movie or the like) and can be labeled by the codec selector, for example, as a video partition, wherein partition 1 can be significantly compressed without a significant observable loss of quality. Additionally, partition 2 can include an icon 104 and a text document 106. The text document 106 could be implemented, for example as a spreadsheet, a word-processing document, a presentation document, or the like. Moreover, the icon 104 can be a static icon. The codec selector can determine that partition 2 should be compressed with RLE to avoid artifacts and/or distortion in the text document 106. Partition 3 can include text 110 and icons 104. Accordingly, the codec selector can label partition 2 as an RLE partition. The text 110 could be, for example onscreen text labeling the icons 104. The codec selector can determine that partition 3 should be compressed with RLE to avoid artifacts and/or distortion in the text 110. Thus, partition 3 can also be labeled as an RLE partition. Partition 4 can include 3-D graphics 112, such as a CAD drawing. The codec selector can determine that partition 4 should be labeled as a 3-D partition that can be significantly compressed without a significant observable loss of quality.

Additionally, the codec selector employ the heuristics to examine multiple frames in the video stream 100 corresponding to partition 1 and partition 4 to determine if partition 1 and/or partition 4 should be compressed with a DCT encoding scheme or a DCT with temporal compression encoding scheme. Upon determining the appropriate encoding scheme for each partition, the codec selector can provide the appropriate codec with the appropriate partition for compression. As illustrated in FIG. 3, a single frame of the video stream 100 can be compressed with multiple codecs to optimize bandwidth use of a network, while maintaining image quality.

Figure 4:
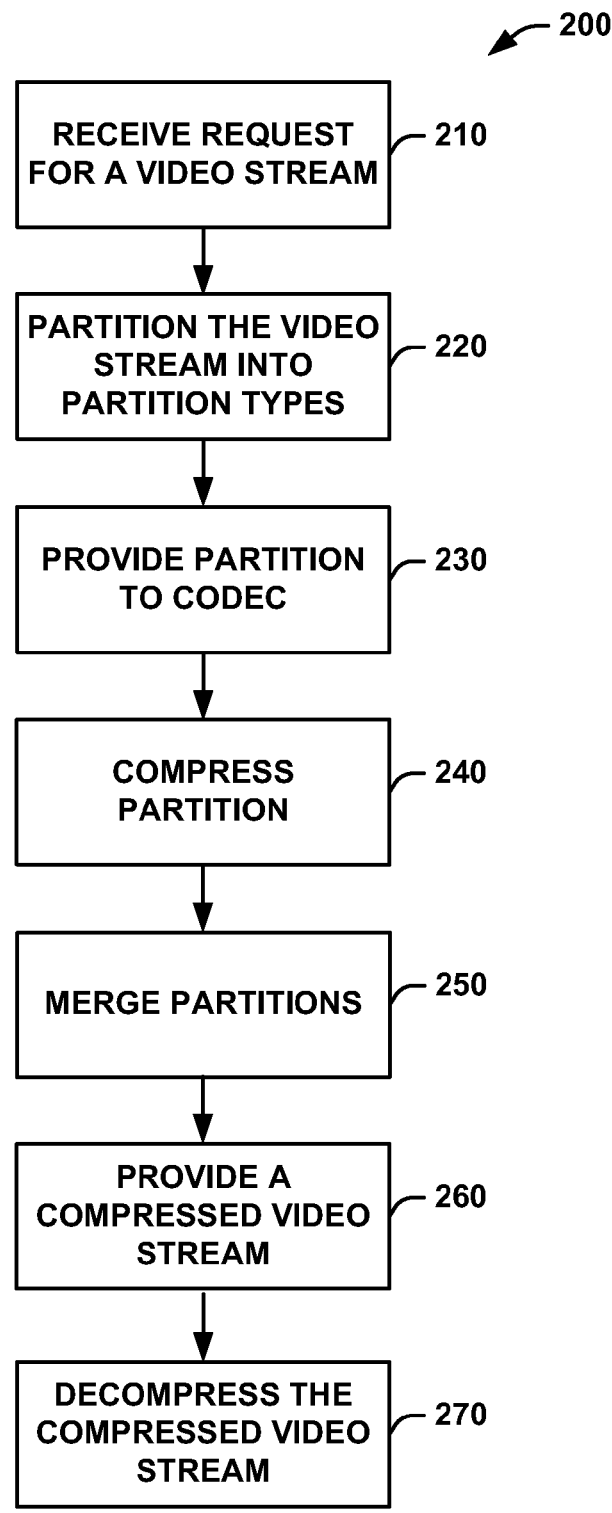
FIG. 4 illustrates an example flowchart of an example method for providing a compressed video stream.
Figure 5:
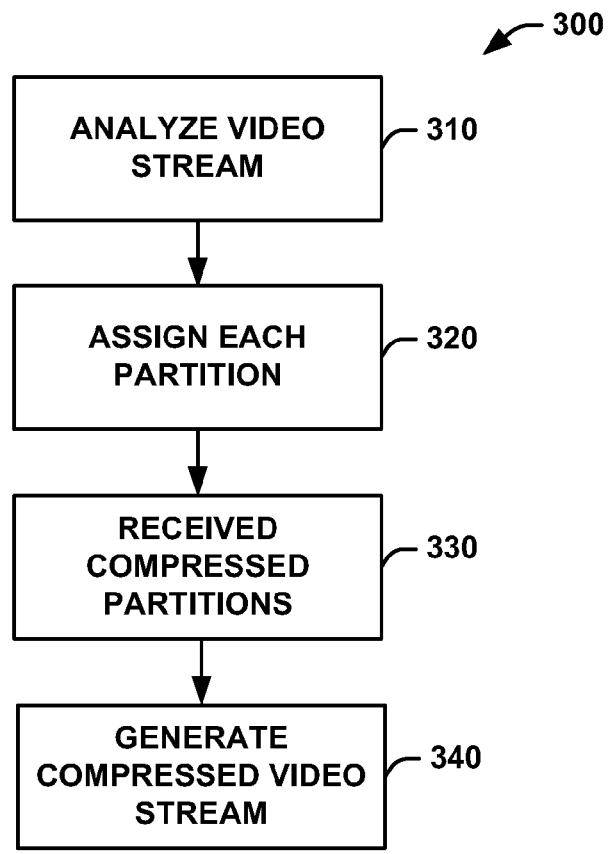
FIG. 5 illustrates another example of a method for providing a compressed video stream.

In view of the foregoing structural and functional features described above, example methods will be better appreciated with reference to FIGS. 4-5. While, for purposes of simplicity of explanation, the example methods of FIGS. 4-5 are shown and described as executing serially, the present examples are not limited by the illustrated order, as some actions could in other examples occur in different orders and/or concurrently from that shown and described herein. Moreover, it is not necessary that all described actions be performed to implement a method.

FIG. 4 illustrates a flow chart of an example method 200 for providing a compressed video stream. The method 200 could be executed, for example, by a remote computer (e.g., the remote computer 4 illustrated in FIG. 1 and/or the remote computer 50 illustrated in FIG. 2). At 210, a request for a video stream can be received at a server (e.g., the server 16 and/or 60 illustrated in FIGS. 1 and 2) of the remote computer via a network. The video stream can be streaming video that includes a series of successive frames. For instance, the video stream can characterize for example, a real-time desktop screen of the remote computer and/or a video. At 220, a codec selector (e.g., the codec selector 20 or 66 illustrated in FIGS. 1 and 2) can employ heuristics to partition the video stream into multiple partitions of different types. In one example, the codec selector can include a mirror driver API that can interface with a mirror driver of the remote system, a 3-D API that can interface with a 3-D rendering engine of the remote system and a media player API that can interface with a media player of the remote system to determine boundaries of the partitions and the types of the partitions. At 230, a given partition can be provided to a codec of a plurality of codecs (e.g., the N number of codecs 24 illustrated in FIG. 1) that corresponds to the type of the given partition.

At 240, each codec that receives a partition can compress the received partition by employment of an associated encoding scheme to provide compressed partitions. In one example, a first codec can compress a first received partition with an RLE encoding scheme. Moreover, a second codec can compress a second received partition with a DCT encoding scheme (e.g., JPEG). Further, a third codec can compress a first received partition with a DCT with a temporal compress encoding scheme (e.g., h.264 or MPEG2). At 250, the compressed partitions can be merged (e.g., by the codec mapper 26 of FIG. 1) to provide a compressed video stream, such that a given frame in the compressed video stream can be compressed with multiple codecs. The compressed video stream can include, for example, mapping data that identifies an encoding scheme employed to compress each of the compressed partitions. Additionally, the compressed video stream can include boundary data that characterizes a boundary of each partition in the compressed video stream. At 260, the compressed video stream can be provided to the client computer over the network. At 270, the compressed video stream can be decompressed (e.g., by the client codec 28 of the client 10 of FIG. 1), such that the decompressed video stream can be displayed (e.g., by the display 30 of FIG. 1). The mapping data and the boundary data of the compressed video stream can facilitate the decompression.

FIG. 5 illustrates a flowchart of an example method 300 for providing a compressed video stream. At 310, a video stream that characterizes a series of successive frames of video can be analyzed by a codec selector (e.g., the codec selector 20 of FIG. 1) to select a boundary of a plurality of partitions of the video stream. The boundaries of each partition of the plurality of partitions can be based on characteristics of a graphical element within a respective partition of the plurality of partitions. At 320, each partition of the plurality of partitions can be assigned (e.g., by the codec selector) to a given one of a plurality of codecs, such that at least two partitions of the plurality of partitions can be assigned to different codecs of the plurality of codecs. At 330, a compressed partition can be received by a codec mapper (e.g., the codec mapper 26 of FIG. 1) from each of the plurality of codecs. At 340, the compressed video stream can be generated by the codec mapper. The compressed video stream can include each of the compressed partitions. The compressed video stream can also include mapping data that characterizes a compression format of each of the partitions.

Figure 6:
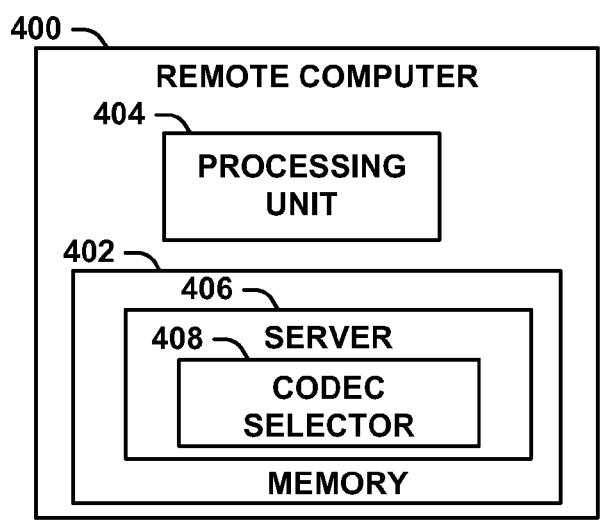
FIG. 6 illustrates another example of a remote computer.

FIG. 6 illustrates an example of a remote computer 400. The remote computer 400 can comprise a memory 402 to store machine readable instructions. The remote computer 400 can also comprise a processing unit 404 to access the memory 402 and execute the machine readable instructions. The machine readable instructions can comprise a server 406 comprising a codec selector 408 to dynamically partition a video stream into a plurality of partitions based on graphical elements of the video stream, such that a given frame of the video stream is divided into the plurality of partitions. The codec selector 408 can also select a plurality of different codecs to compress the plurality of partitions based on the graphical elements of the video stream.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims.

What is claimed is:

1. A system comprising:
   a memory to store machine readable instructions; and
   a processing unit to access the memory and execute the machine readable instructions, the machine readable instructions comprising:
     a server comprising
       a codec selector including a plurality of application programming interfaces (APIs), the codec selector to:
         dynamically partition a video stream into a plurality of partitions based on graphical elements of the video stream, such that a given frame of the video stream is divided into the plurality of partitions;
         assign a first codec to a first partition among the plurality of partitions to compress the first partition in response to a determination that the graphical elements of the first partition include text or two dimensional graphics;
         assign a second codec to a second partition among the plurality of partitions to compress the second partition in response to a determination that the graphical elements of the second partition include three dimensional graphics; and
         assign a third codec to a third partition among the plurality of partitions to compress the third partition in response to a determination that the graphical elements of the third partition include video data; and
       a codec mapper to merge each compressed partition to provide a compressed video stream to the client interface, wherein a given frame of the compressed video stream is compressed with multiple encoding schemes;

wherein the compressed video stream comprises:
mapping data that characterizes a compression format of each of the compressed partitions; and
boundary data that characterizes a boundary of each of the compressed partitions.

2. The system of claim 1, wherein the video stream represents a real-time desktop associated with the server.

3. The system of claim 1, wherein each of the first, second, and third codec compress each respective partition into a different respective compression format.

4. The system of claim 1, wherein the codec selector is further to employ a hierarchy of heuristics to select a given codec of the plurality of codecs for a given partition of the plurality of partitions.

5. The system of claim 4, wherein a given heuristic of the hierarchy of heuristics comprises an examination of commands employed to generate a graphical element in the given partition of the plurality of partitions.

6. The system of claim 4, wherein a given heuristic of the hierarchy comprises an examination of a number of colors employed to generate a graphical element in the given partition of the video stream.

7. The system of claim 1, wherein the APIs each interfaces with a component of the system employed to facilitate generation of the graphical elements of the video stream, such that a respective API is to determine a boundary of each partition of the plurality of partitions in the video stream.

8. The system of claim 1, wherein the codec selector is further to:
periodically re-partition the video stream into another plurality of partitions based on graphical elements of the video stream at a time of the periodic re-partitioning, such that another frame of the video stream is divided into the another plurality of partitions; and
select a plurality of different codecs to compress the another plurality of partitions based on the graphical elements of the video stream at a time of the periodic re-partitioning.

9. The system of claim 1, wherein the codec selector includes a mirror driver in communication with a first API among the plurality of APIs, the mirror driver to determine which partition of the video stream contains text and/or two-dimensional graphics.

10. The system of claim 1, wherein the codec selector includes a three dimensional (3-D) rendering engine coupled to a second API among the plurality of APIs to determine which partition among the plurality of partitions contains 3-D rendered data.

11. The system of claim 1, further including a video player coupled to a third API among the plurality of APIs to determine which partition among the plurality of partitions contains a video.

12. The system of claim 1, further comprising a decoding codec to decompress the video stream.

13. A method comprising:
analyzing, using a codec selector comprising a plurality of application programming interfaces (APIs), a video stream that characterizes a series of successive frames of video to select a boundary of a plurality of partitions of the video stream, wherein the boundary of each partition of the plurality of partitions is based on characteristics of a graphical element within a respective partition of the plurality of partitions;
labeling each of the plurality of partitions with a label using the plurality of APIs;
assigning, using the codec selector, a different respective codec among the plurality of different codecs to each of the respective partitions labeled by the plurality of APIs, such that:
a first codec is assigned to a first partition among the plurality of partitions to compress the first partition in response to a determination that the graphical elements of first partition include text or two dimensional graphics;
a second codec is assigned to a second partition among the plurality of partitions to compress the second partition in response to a determination that the graphical elements of the second partition include three dimensional graphics; and
a third codec is assigned to a third partition among the plurality of partitions to compress the third partition in response to a determination that the graphical elements of the third partition include video data;
receiving a compressed partition from each of the plurality of codecs; and
generating a compressed video stream, the compressed video stream comprising:
each of the compressed partitions;
mapping data that characterizes compression format of each of the compressed partitions; and
boundary data that characterizes a boundary of each of the compressed partitions.

14. The method of claim 13, further comprising:
providing the compressed video stream to a client over a network; and
decompressing the compressed video stream at the client based on the mapping data.

15. The method of claim 13, wherein the first codec employs run length encoding to compress the first partition.

16. The method of claim 13, wherein the second codec employs discrete cosine transform (DCT) or DCT with temporal compression to compress the second partition.

17. A non-transitory computer readable medium to store machine readable instructions, the machine readable instructions comprising:
a server comprising:
a client interface to process a request for a video stream comprising a plurality of successive frames provided from a client computer via a network;
a codec selector comprising:
a plurality of application programming interfaces (APIs), each API to:
monitor a component of a system control that facilitates generation of graphical elements in the video stream;
identify a partition of the video stream that provides a type of graphical element; and
label a different partition of the video stream;
wherein the codec selector assigns:
a first codec to a first partition among the plurality of partitions labeled by the plurality of APIs, in response to a determination that the graphical elements of the first partition include text or two dimensional graphics;
a second codec to a second partition among the plurality of partitions to compress the second partition in response to a determination that the graphical elements of the second partition include three dimensional graphics; and
a third codec to a third partition among the plurality of partitions to compress the third partition in response to a determination that the graphical elements of the third partition include video data; and a codec mapper to merge each compressed partition to provide a compressed video stream to the client interface, wherein a given frame of the compressed video stream is compressed with multiple encoding schemes;

wherein the compressed video stream comprises:
  mapping data that characterize compression format of each of the compressed partitions; and
  boundary data that characterizes a boundary of each of the compressed partitions.

\* \* \* \* \*